US012305979B2

(12) United States Patent
Jansen

(10) Patent No.: US 12,305,979 B2
(45) Date of Patent: May 20, 2025

(54) INTERFEROMETER SYSTEM AND LITHOGRAPHIC APPARATUS

(71) Applicant: ASML NETHERLANDS B.V., Veldhoven (NL)

(72) Inventor: Maarten Jozef Jansen, Hoogeloon (NL)

(73) Assignee: ASML NETHERLANDS B.V., Veldhoven (NL)

( * ) Notice: Subject to any disclaimer, the term of this patent is extended or adjusted under 35 U.S.C. 154(b) by 136 days.

(21) Appl. No.: 18/027,851

(22) PCT Filed: Aug. 20, 2021

(86) PCT No.: PCT/EP2021/073179
§ 371 (c)(1),
(2) Date: Mar. 22, 2023

(87) PCT Pub. No.: WO2022/078657
PCT Pub. Date: Apr. 21, 2022

(65) Prior Publication Data
US 2023/0332880 A1 Oct. 19, 2023

(30) Foreign Application Priority Data

Oct. 12, 2020 (EP) .................................... 20201359

(51) Int. Cl.
G01B 9/02015 (2022.01)
G01B 9/02091 (2022.01)

(52) U.S. Cl.
CPC ..... *G01B 9/02028* (2013.01); *G01B 9/02091* (2013.01); *G01B 2290/45* (2013.01)

(58) Field of Classification Search
CPC ............ G01B 9/02028; G01B 9/02091; G01B 2290/45; G01B 2290/60; G01B 9/02065; G01B 9/0209; G01B 9/0207
See application file for complete search history.

(56) References Cited

U.S. PATENT DOCUMENTS 6,020,964 A 2/2000 Loopstra et al.
6,490,046 B1 12/2002 Drabarek et al.
(Continued)

FOREIGN PATENT DOCUMENTS

| CN | 109363638 | 2/2019 |
| FR | 2765964 | 1/1999 |
| WO | 2018/172119 | 9/2018 |

OTHER PUBLICATIONS

International Search Report and Written Opinion issued in the corresponding International Application No. PCT/EP2021/073179 dated Nov. 11, 2021.
(Continued)

Primary Examiner — Tarifur R Chowdhury
Assistant Examiner — Kemaya Nguyen
(74) Attorney, Agent, or Firm — Pillsbury Winthrop Shaw Pittman, LLP

(57) ABSTRACT

Interferometer system including a first detector for receiving a first measurement beam travelling to a reference surface; a second detector for receiving a second measurement beam travelling to the target surface; a reference variable delay path and/or measurement variable delay path and a delay path controller for adapting a delay length. A reference spectral coherence pulse occurs at the first detector, at a reference coherence arrangement and a measurement spectral coherence pulse at the second detector at a measurement coherence arrangement. A control unit receives a reference coherence signal from the first detector, and a measurement coherence signal from the second detector, and determines a zero-position of the target surface based on the reference coherence signal and the measurement coherence signal, and based on the reference coherence arrangement and the measurement coherence arrangement and/or a delay path (Continued)

difference between the reference coherence arrangement and the measurement coherence arrangement.

20 Claims, 6 Drawing Sheets

(56) References Cited

U.S. PATENT DOCUMENTS

| | | | |
|---|---|---|---|
| 6,952,253 B2 | 10/2005 | Lof et al. | |
| 7,030,994 B2 | 4/2006 | Hill | |
| 9,448,058 B2 | 9/2016 | Gilbson et al. | |
| 11,719,529 B2 * | 8/2023 | Jansen | G03F 7/70775 356/484 |
| 2007/0058173 A1 | 3/2007 | Holzapfel | |
| 2008/0285043 A1 * | 11/2008 | Fercher | G01B 9/02058 356/451 |
| 2013/0194541 A1 * | 8/2013 | Aoki | G01B 9/02089 356/479 |

OTHER PUBLICATIONS

V. Ullmann et al., "White-light interferometers with polarizing optics for length measurements with an applicable zero-point detection", Measurement Science and Technology, vol. 26, No. 8, pp. 1-15 (2015).

* cited by examiner

INTERFEROMETER SYSTEM AND LITHOGRAPHIC APPARATUS

CROSS-REFERENCE TO RELATED APPLICATIONS

This application is the U.S. national phase entry of PCT Application No. PCT/EP2021/073179 filed Aug. 20, 2021, which claims priority of European Patent Application No. 20201359.5 which was filed on Oct. 12, 2020 and which is incorporated herein in its entirety by reference.

FIELD

The present invention relates to the field of position measurement systems, in particular interferometer systems, which can e.g. be used in a lithographic apparatus.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") of a patterning device (e.g., a mask) onto a layer of radiation-sensitive material (resist) provided on a substrate (e.g., a wafer). An inspection apparatus is for example suitable for inspecting a pattern which has been applied to an object e.g. to a substrate, e.g. to a wafer.

As semiconductor manufacturing processes continue to advance, the dimensions of circuit elements have continually been reduced while the amount of functional elements, such as transistors, per device has been steadily increasing over decades, following a trend commonly referred to as 'Moore's law'. To keep up with Moore's law the semiconductor industry is chasing technologies that enable to create increasingly smaller features. To project a pattern on a substrate a lithographic apparatus may use electromagnetic radiation. The wavelength of this radiation determines the minimum size of features which are patterned on the substrate. Typical wavelengths currently in use are 365 nm (i-line), 248 nm, 193 nm and 13.5 nm. A lithographic apparatus, which uses extreme ultraviolet (EUV) radiation, having a wavelength within a range of 4 nm to 20 nm, for example 6.7 nm or 13.5 nm, may be used to form smaller features on a substrate than a lithographic apparatus which uses, for example, radiation with a wavelength of 193 nm.

During various stages of the lithographic process, the substrate may be arranged on a substrate support. To ensure correct positioning of the substrate, e.g. while the pattern is subjected or while one or more characteristics of the substrate are measured of inspected, the position of substrate support is determined. For example, one or more interferometers may be used to determine the position of the substrate support in one or more degrees of freedom.

Usually, a zero-position of the substrate support is determined, such that the position of the substrate support is determined relative to the zero-position. The inventors have found that known interferometer systems have several disadvantages, in particular when determining the zero-position.

SUMMARY

It is an object of the invention to provide an alternative interferometer system. It is a further object of the invention to provide an interferometer system that allows for advantageous determination of the zero-position.

This object is achieved with an interferometer system for determining a position of a target surface, wherein the interferometer system comprises a first detector configured to receive a first reference beam that is adapted to travel a first reference beam path including a reference beam path. The first detector is further configured to receive a first measurement beam that is adapted to travel a first measurement beam path including a measurement beam path and a reference axis path determined by a reference surface. The interferometer system further comprises a second detector configured to receive a second reference beam that is adapted to travel a second reference beam path including the reference beam path. The second detector is further configured to receive a second measurement beam that is adapted to travel a second measurement beam path including the measurement beam path and a measurement axis path determined by the target surface. The interferometer system further comprises a reference variable delay path which is part of the reference beam path and/or a measurement variable delay path which is part of the measurement beam path. The interferometer system further comprises a delay path controller configured to adapt delay lengths of the reference variable delay path and/or the measurement variable delay path. During operational use a reference spectral coherence pulse of the first reference beam and the first measurement beam occurs at the first detector, when the delay length corresponds to a reference coherence arrangement, and a measurement spectral coherence pulse of the second reference beam and the second measurement beam occurs at the second detector, when the delay length corresponds to a measurement coherence arrangement. The interferometer system further comprises a control unit configured to receive a reference coherence signal from the first detector, and a measurement coherence signal from the second detector. The control unit is further configured to determine a zero-position of the target surface based on the reference coherence signal and the measurement coherence signal, and based on the reference coherence arrangement and the measurement coherence arrangement and/or a delay path difference between the reference coherence arrangement and the measurement coherence arrangement.

The invention thus relates to an interferometer system, which advantageously allows determining the zero-position of the target surface, e.g. relative to the reference surface. Using the reference surface, the inventors have been able to e.g. apply time domain Optical Coherent Tomography techniques for long-range measurements.

In embodiments, the interferometer system comprises a reference beam path delay for increasing or decreasing a length of the reference beam path relative to a length the measurement beam path. Advantageously, the delay lengths of reference variable delay path and/or the measurement variable delay path can be provided to be adaptable over a relatively short range while the reference surface and target surface can be arranged relatively far apart.

In embodiments, the interferometer system comprises a broadband light source configured to emit broadband radiation forming at least a part of the first and second measurement beam and the first and second reference beam. During operational use, the broadband radiation emitted by broadband radiation source is adapted to cause the reference spectral coherence pulse and the measurement spectral coherence pulse. Advantageously, the broadband radiation allows for simple detection of the coherence.

In embodiments, the interferometer system comprises a narrowband light source configured to emit narrowband radiation forming at least a part of the first and second measurement beam and the first and second reference beam. In embodiments, the delay path controller is configured to, during operational use, adapt the delay lengths at least until the reference spectral coherence pulse and the measurement spectral coherence pulse have occurred, wherein the control unit is configured to determine the zero-position of the target surface based on the narrowband radiation received by the first detector and/or second detector and/or a first reference detector between a reference coherence time and a measurement coherence time. Advantageously, the narrowband radiation can be stable at a known wavelength, e.g. allowing it to be used for determining the optical path difference between the reference spectral coherence pulse and the measurement spectral coherence pulse.

In embodiments, the interferometer system comprises a narrowband modulator configured to modulate the narrowband radiation forming part of the first and second measurement beam to be at a shifted frequency or phase relative to the narrowband radiation forming part of the first and second reference beam. Advantageously, heterodyne detection can be used.

In embodiments, the delay path controller is configured to maintain the delay lengths at the reference coherence arrangement, wherein the control unit is configured to determine the zero-position of the target surface based on the length of the measurement axis path being equal to a length of the reference axis path when the measurement spectral coherence pulse is detected. Advantageously, the length of the reference axis path at the zero-position is known, at least relative to the reference axis path.

In embodiments, the narrowband light source is configured to add the narrowband radiation to the reference beam path downstream of the reference variable delay path and/or to the measurement beam path downstream of the measurement variable delay path. This may be advantageous with regard to power variation of the narrowband radiation.

In embodiments, the interferometer system comprises a broadband modulator configured to modulate the broadband radiation forming part of the first and second measurement beam to be at a shifted frequency or phase relative to the broadband radiation forming part of the first and second reference beam. Advantageously, heterodyne detection can be applied for the broadband radiation.

In embodiments, the interferometer system comprises a first reference detector configured to receive the first and/or second measurement beam, and to receive the first and/or second reference beam. The first reference detector is arranged downstream of the reference variable delay path and/or the measurement variable delay path. Advantageously, the first reference detector can e.g. be used to receive narrowband radiation and/or to determine e.g. drift of the reference variable delay path and/or the measurement variable delay path and/or the reference beam path and/or the measurement beam path.

In embodiments, the interferometer system comprises a second reference detector configured to receive the first and/or second measurement beam, and to receive the first and/or second reference beam. The second reference detector is arranged upstream of the reference variable delay path and/or the measurement variable delay path. The control unit is configured to receive a first reference detector signal from the first reference detector, and to receive a second reference detector signal from the second reference detector. The control unit is further configured to determine the delay lengths based on the first reference detector signal and the second reference detector signal. Advantageously, the delay length and/or drift of the delay length can be determined.

In embodiments, the reference beam path comprises a longer delayed beam path configured to guide a longer delayed beam, and a shorter delayed beam path configured to guide a shorter delayed beam, wherein the longer delayed beam path has a length that is greater than a length of the shorter delayed beam path. Advantageously, by having a longer delayed beam and a shorter delayed beam, it can be ensured that coherence occurs in multiple locations, e.g. at a reference axis reference detector and/or a measurement axis reference detector. This may e.g. be advantageous when the interferometer system comprises different fibres for providing the beam of the measurement axis path and the reference axis path.

In embodiments, the interferometer system comprises one or more further detectors, each configured to receive a respective further reference beam that is adapted to travel a respective further reference beam path including the reference beam path. Each further detector is further configured to receive a respective further measurement beam that is adapted to travel a respective further measurement beam path including the measurement beam path and a respective further measurement axis path determined by a respective further target surface. The control unit is configured to determine a zero-position of each respective further target surface based on the reference coherence signal and the respective further measurement coherence signal, and the reference coherence arrangement and a respective further measurement coherence arrangement and/or a respective further delay path difference between the reference coherence arrangement and the respective further measurement coherence arrangement. Advantageously, the zero-point of multiple target surfaces can be determined using a single reference surface.

In embodiments, the control unit is configured to determine the zero-position of the target surface by applying time domain optical coherence tomography. The invention advantageously allows applying time domain optical coherence tomography for long-range measurements.

The invention further relates to a stage apparatus, comprising the interferometer system for determining a position of a target surface according to the invention, and an object holder configured to hold an object, wherein the object holder comprises the target surface. Advantageously, the interferometer system can be used to determine the zero-position of the object holder.

The invention further relates to a lithographic apparatus comprising the interferometer system for determining a position of a target surface according to the invention. The lithographic apparatus further comprises a mask support for holding a patterning device having a pattern, and a projection system for projecting the pattern onto an object comprising a substrate. The lithographic apparatus further comprises an object holder configured to hold an object, wherein the object holder comprises the target surface. Advantageously, the interferometer system can be used to determine the zero-position of the object holder.

BRIEF DESCRIPTION OF THE DRAWINGS

Embodiments of the invention will now be described, by way of example only, with reference to the accompanying schematic drawings, in which the same reference numbers indicate the same or similar features. In the drawings.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective; binary, phase-shifting, hybrid, etc.), examples of other such patterning devices include a programmable mirror array and a programmable LCD array.

Figure 1:
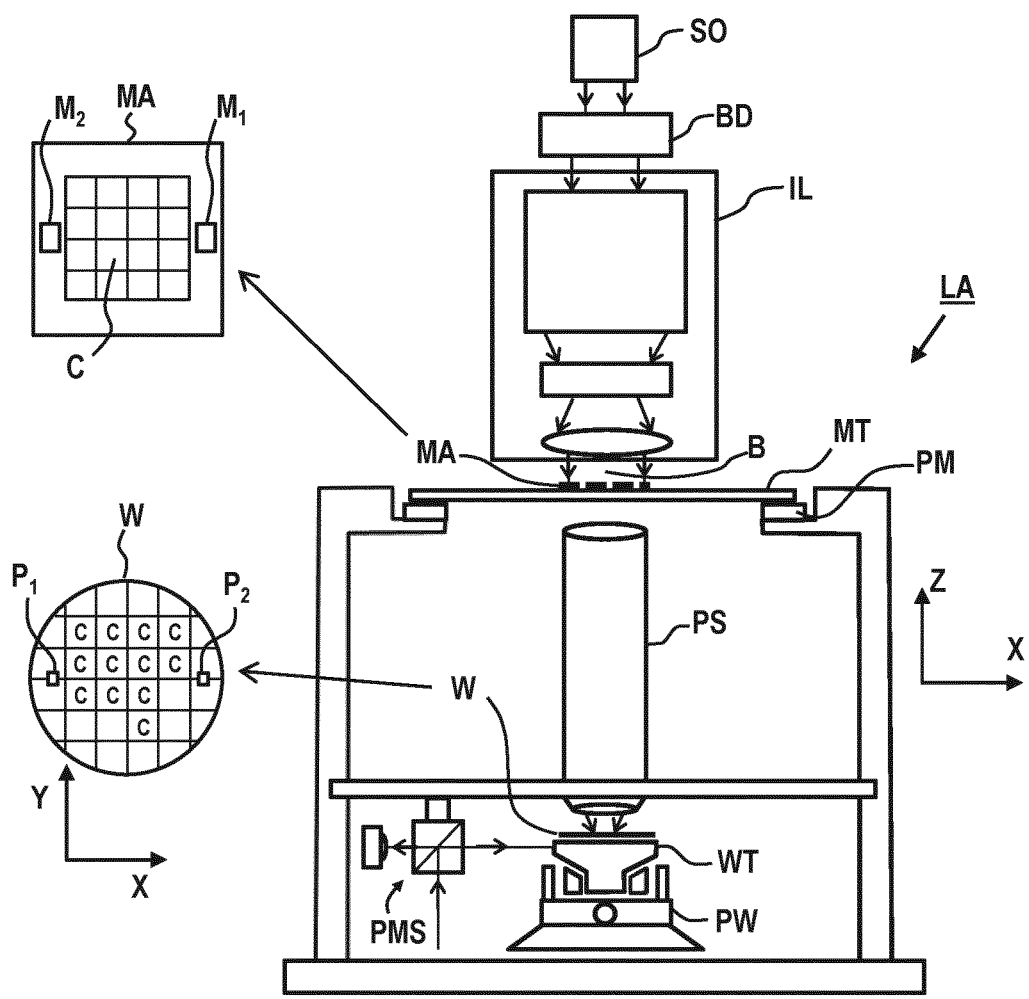
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such a "multiple stage" machine, the substrate supports WT may be used in parallel, and/or steps in preparation of a subsequent exposure of the substrate W may be carried out on the substrate W located on one of the substrate supports WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the patterning device MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

To clarify the invention, a Cartesian coordinate system is used. The Cartesian coordinate system has three axes, i.e., an x-axis, a y-axis and a z-axis. Each of the three axes is orthogonal to the other two axes. A rotation around the x-axis is referred to as an Rx-rotation. A rotation around the y-axis is referred to as an Ry-rotation. A rotation around about the z-axis is referred to as an Rz-rotation. The x-axis and the y-axis define a horizontal plane, whereas the z-axis is in a vertical direction. The Cartesian coordinate system is not limiting the invention and is used for clarification only. Instead, another coordinate system, such as a cylindrical coordinate system, may be used to clarify the invention. The orientation of the Cartesian coordinate system may be different, for example, such that the z-axis has a component along the horizontal plane.

Figure 2:
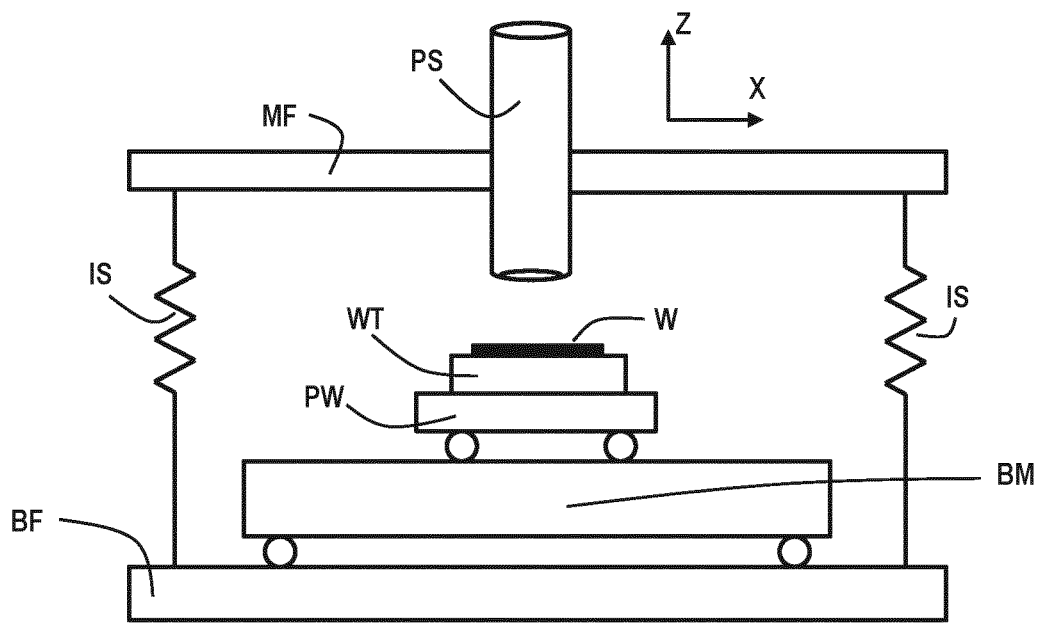
FIG. 2 depicts a detailed view of a part of the lithographic apparatus of FIG. 1.

FIG. 2 shows a more detailed view of a part of the lithographic apparatus LA of FIG. 1. The lithographic apparatus LA may be provided with a base frame BF, a balance mass BM, a metrology frame MF and a vibration isolation system IS. The metrology frame MF supports the projection system PS. Additionally, the metrology frame MF may support a part of the position measurement system PMS. The metrology frame MF is supported by the base frame BF via the vibration isolation system IS. The vibration isolation system IS arranged to prevent or reduce vibrations from propagating from the base frame BF to the metrology frame MF.

The second positioner PW is arranged to accelerate the substrate support WT by providing a driving force between the substrate support WT and the balance mass BM. The driving force accelerates the substrate support WT in a desired direction. Due to the conservation of momentum, the driving force is also applied to the balance mass BM with equal magnitude, but at a direction opposite to the desired direction. Typically, the mass of the balance mass BM is significantly larger than the masses of the moving part of the second positioner PW and the substrate support WT.

In an embodiment, the second positioner PW is supported by the balance mass BM. For example, wherein the second positioner PW comprises a planar motor to levitate the substrate support WT above the balance mass BM. In another embodiment, the second positioner PW is supported by the base frame BF. For example, wherein the second positioner PW comprises a linear motor and wherein the second positioner PW comprises a bearing, like a gas bearing, to levitate the substrate support WT above the base frame BF.

The position measurement system PMS may comprise any type of sensor that is suitable to determine a position of the substrate support WT. The position measurement system PMS may comprise any type of sensor that is suitable to determine a position of the mask support MT. The sensor may be an optical sensor such as an interferometer or an encoder. The position measurement system PMS may comprise a combined system of an interferometer and an encoder. The sensor may be another type of sensor, such as a magnetic sensor. a capacitive sensor or an inductive sensor. The position measurement system PMS may determine the position relative to a reference, for example the metrology frame MF or the projection system PS. The position measurement system PMS may determine the position of the substrate table WT and/or the mask support MT by measuring the position or by measuring a time derivative of the position, such as velocity or acceleration.

The position measurement system PMS may comprise an encoder system. An encoder system is known from for example, United States patent application US2007/0058173A1, filed on Sep. 7, 2006, hereby incorporated by reference. The encoder system comprises an encoder head, a grating and a sensor. The encoder system may receive a primary radiation beam and a secondary radiation beam. Both the primary radiation beam as well as the secondary radiation beam originate from the same radiation beam, i.e., the original radiation beam. At least one of the primary radiation beam and the secondary radiation beam is created by diffracting the original radiation beam with the grating. If both the primary radiation beam and the secondary radiation beam are created by diffracting the original radiation beam with the grating, the primary radiation beam needs to have a different diffraction order than the secondary radiation beam. Different diffraction orders are, for example, $+1^{st}$ order, $-1^{st}$ order, $+2^{nd}$ order and $-2^{nd}$ order. The encoder system optically combines the primary radiation beam and the secondary radiation beam into a combined radiation beam. A sensor in the encoder head determines a phase or phase difference of the combined radiation beam. The sensor generates a signal based on the phase or phase difference. The signal is representative of a position of the encoder head relative to the grating. One of the encoder head and the grating may be arranged on the substrate structure WT. The other of the encoder head and the grating may be arranged on the metrology frame MF or the base frame BF. For example, a plurality of encoder heads is arranged on the metrology frame MF, whereas a grating is arranged on a top surface of the substrate support WT. In another example, a grating is arranged on a bottom surface of the substrate support WT, and an encoder head is arranged below the substrate support WT.

The position measurement system PMS may comprise an interferometer system. An interferometer system is known from, for example, U.S. Pat. No. 6,020,964, filed on Jul. 13, 1998, hereby incorporated by reference. The interferometer system may comprise a beam splitter, a mirror, a reference mirror and a sensor. A beam of radiation is split by the beam splitter into a reference beam and a measurement beam. The measurement beam propagates to the mirror and is reflected by the mirror back to the beam splitter. The reference beam propagates to the reference mirror and is reflected by the reference mirror back to the beam splitter. At the beam splitter, the measurement beam and the reference beam are combined into a combined radiation beam. The combined radiation beam is incident on the sensor. The sensor determines a phase or a frequency of the combined radiation beam. The sensor generates a signal based on the phase or the frequency. The signal is representative of a displacement of the mirror. In an embodiment, the mirror is connected to the substrate support WT. The reference mirror may be connected to the metrology frame MF. In an embodiment, the measurement beam and the reference beam are combined into a combined radiation beam by an additional optical component instead of the beam splitter.

The first positioner PM may comprise a long-stroke module and a short-stroke module. The short-stroke module is arranged to move the mask support MT relative to the long-stroke module with a high accuracy over a small range of movement. The long-stroke module is arranged to move the short-stroke module relative to the projection system PS with a relatively low accuracy over a large range of movement. With the combination of the long-stroke module and the short-stroke module, the first positioner PM is able to move the mask support MT relative to the projection system PS with a high accuracy over a large range of movement. Similarly, the second positioner PW may comprise a long-stroke module and a short-stroke module. The short-stroke module is arranged to move the substrate support WT relative to the long-stroke module with a high accuracy over a small range of movement. The long-stroke module is arranged to move the short-stroke module relative to the projection system PS with a relatively low accuracy over a large range of movement. With the combination of the long-stroke module and the short-stroke module, the second positioner PW is able to move the substrate support WT relative to the projection system PS with a high accuracy over a large range of movement.

The first positioner PM and the second positioner PW each are provided with an actuator to move respectively the mask support MT and the substrate support WT. The actuator may be a linear actuator to provide a driving force along a single axis, for example the y-axis. Multiple linear actuators may be applied to provide driving forces along multiple axes. The actuator may be a planar actuator to provide a driving force along multiple axis. For example, the planar actuator may be arranged to move the substrate support WT in 6 degrees of freedom. The actuator may be an electromagnetic actuator comprising at least one coil and at least one magnet. The actuator is arranged to move the at least one coil relative to the at least one magnet by applying an electrical current to the at least one coil. The actuator may be a moving-magnet type actuator, which has the at least one magnet coupled to the substrate support WT respectively to the mask support MT. The actuator may be a moving-coil type actuator which has the at least one coil coupled to the substrate support WT respectively to the mask support MT. The actuator may be a voice-coil actuator, a reluctance actuator, a Lorentz-actuator or a piezo-actuator, or any other suitable actuator.

Figure 3:
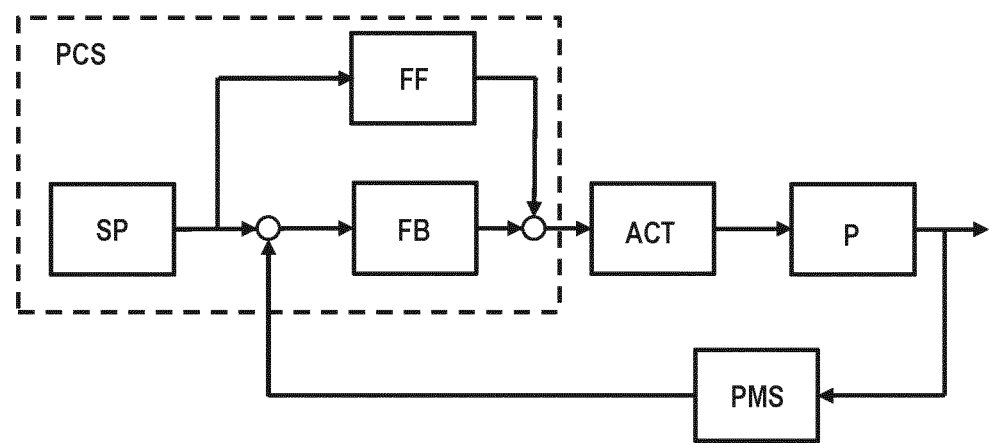
FIG. 3 schematically depicts a position control system.

The lithographic apparatus LA comprises a position control system PCS as schematically depicted in FIG. 3. The position control system PCS comprises a setpoint generator SP, a feedforward controller FF and a feedback controller FB. The position control system PCS provides a drive signal to the actuator ACT. The actuator ACT may be the actuator of the first positioner PM or the second positioner PW. The actuator ACT drives the plant P, which may comprise the substrate support WT or the mask support MT. An output of the plant P is a position quantity such as position or velocity or acceleration. The position quantity is measured with the position measurement system PMS. The position measurement system PMS generates a signal, which is a position signal representative of the position quantity of the plant P. The setpoint generator SP generates a signal, which is a reference signal representative of a desired position quantity of the plant P. For example, the reference signal represents a desired trajectory of the substrate support WT. A difference between the reference signal and the position signal forms an input for the feedback controller FB. Based on the input, the feedback controller FB provides at least part of the drive signal for the actuator ACT. The reference signal may form an input for the feedforward controller FF. Based on the input, the feedforward controller FF provides at least part of the drive signal for the actuator ACT. The feedforward FF may make use of information about dynamical characteristics of the plant P, such as mass, stiffness, resonance modes and eigenfrequencies.

A topography measurement system, level sensor or height sensor, and which may be integrated in the lithographic apparatus, is arranged to measure a topography of a top surface of a substrate (or wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focused position on the substrate. It will be understood that "height" in this context refers to a dimension broadly out of the plane to the substrate (also referred to as the Z-axis). Typically, the level or height sensor performs measurements at a fixed location (relative to its own optical system) and a relative movement between the substrate and the optical system of the level or height sensor results in height measurements at locations across the substrate.

As explained above, the position measurement system PMS for determining the position of substrate table WT may comprise an interferometer system, which may e.g. be in accordance with one or more embodiments of the invention.

Figure 4A:
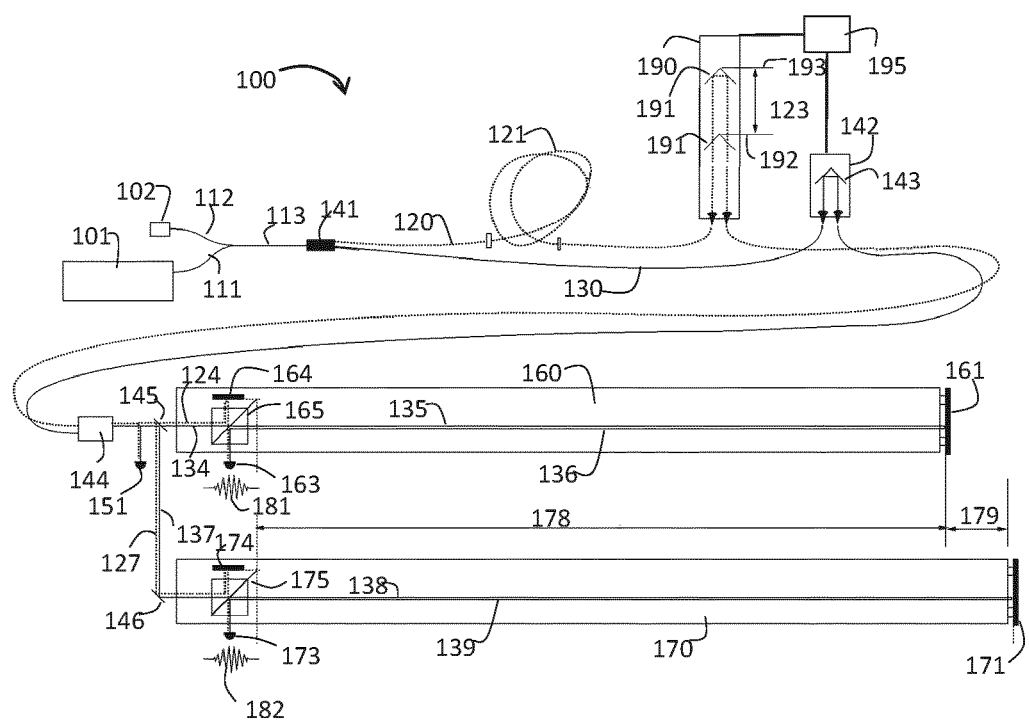
FIG. 4a schematically illustrates an interferometer system according to a first embodiment of the invention.
Figures 4B, 4C:
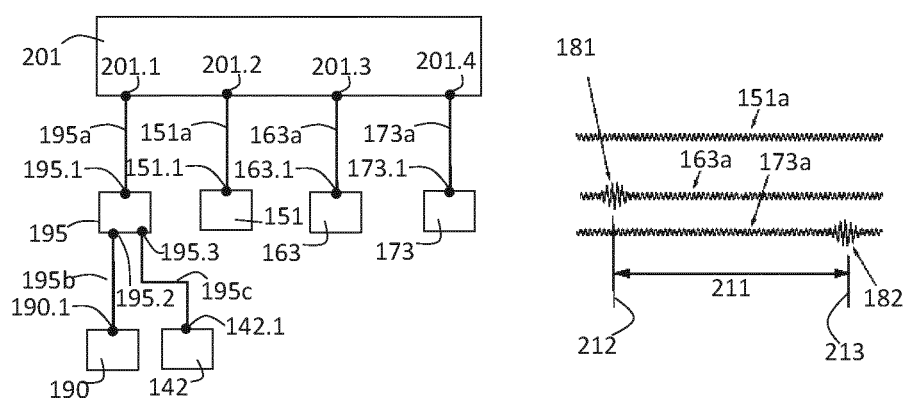
FIG. 4b schematically illustrates a control unit of the interferometer system.
FIG. 4c schematically illustrates signals received by the control unit.

FIG. 4a-4c schematically illustrate a first embodiment the invention, relating to an interferometer system 100 for determining a position of a target surface 171. The interferometer system 100 comprises a first detector 163 configured to receive a first reference beam 124 that is adapted to travel a first reference beam path including a reference beam path 120. The first detector 163 is further configured to receive a first measurement beam 134 that is adapted to travel a first measurement beam path including a measurement beam path 130 and a reference axis path 135, 136 determined by a reference surface 161. Reference beam path 120 and measurement beam path 130 extend between beam splitter 141 and optical combiner 144. The interferometer system 100 further comprises a second detector 173 configured to receive a second reference beam 127 that is adapted to travel a second reference beam path including the reference beam path 120. The second detector 173 is further configured to receive a second measurement beam 137 that is adapted to travel a second measurement beam path including the measurement beam path 130 and a measurement axis path 138, 139 determined by the target surface 171. The interferometer system 100 further comprises a reference variable delay path 190 which is part of the reference beam path 120 and/or a measurement variable delay path 142 which is part of the measurement beam path 130. Reference beam path 120 and measurement beam path 130 represent the beam delivery towards optical combiner 144. The interferometer system 100 also comprises a delay path controller 195 configured to adapt delay lengths of the reference variable delay path 190 and/or the measurement variable delay path 142. During operational use, a reference spectral coherence pulse 181 of the first reference beam 124 and the first measurement beam 134 occurs at the first detector 163, when the delay lengths correspond to a reference coherence arrangement 192. A measurement spectral coherence pulse 182 of the second reference beam 127 and the second measurement beam 137 occurs at the second detector 173, when the delay lengths correspond to a measurement coherence arrangement 193. The interferometer system 100 further comprises a control unit 201, which for the sake of clarity is only depicted in FIG. 4b. The control unit 201 is configured to receive a reference coherence signal 163a from the first detector 163, and a measurement coherence signal 173a from the second detector 173. The control unit 201 is further configured to determine a zero-position of the target surface 171 based on the reference coherence signal 163a and the measurement coherence signal 173a, and on the reference coherence arrangement 192 and the measurement coherence arrangement 193 or a delay path difference 123 between the reference coherence arrangement 192 and the measurement coherence arrangement 193.

The invention thus provides the interferometer system 100, comprising at least the first detector 163 and the second detector 173, which during operational use each receive a measurement beam 134, 137 and a reference beam 124, 127. The first 134 and second measurement beam 137 both travel through a measurement beam path 130, optionally as a single measurement beam. In the shown example, the interferometer system 100 comprises a beam splitter 145 for splitting said single measurement beam in the first measurement beam 134 and the second measurement beam 137. Optionally the second measurement beam 137 is directed by a mirror 146.

The first measurement beam 134 is e.g. guided by a first beam guiding module 165 to travel along a reference axis 160. The first measurement beam 134 travels towards the reference surface 161 along a first reference axis path part 135 of the reference axis path 135, 136. The reference surface 161 may e.g. comprise a reflective surface. The first measurement beam 134 is then reflected back along a second reference axis path part 136 of the reference axis path 135, 136. The first measurement beam 134 is then directed towards the first detector 163 by the first beam guiding module 165.

The second measurement beam 137 is e.g. guided by a second beam guiding module 175 to travel along a measurement axis 170. The second measurement beam 137 travels towards the target surface 171 along a first measurement axis path part 138 of the measurement axis path 138, 139. The target surface 171 may e.g. comprise a reflective surface. The second measurement beam 137 is then reflected back along a second measurement axis path part 139 of the measurement axis path 138, 139. The second measurement beam 137 is then directed towards the second detector 173 by the second beam guiding module 175.

The first 124 and second reference beam 127 both travel through a reference beam path 120, optionally as a single reference beam. In the shown example, the interferometer system 100 comprises a beam splitter 145 for splitting said single reference beam into the first reference beam 124 and the second reference beam 127. The first reference beam 124 is e.g. guided by the first beam guiding module 165 towards a first reference mirror 164, which reflects the first reference beam 124 towards the first detector 163. The second reference beam 127 is e.g. guided by the second beam guiding module 175 towards a second reference mirror 174 which reflects the second reference beam 127 towards the second detector 173.

The reference surface 161 is arranged at a reference surface distance 178 from the optical reference plane of the beam guiding module 165, wherein the optical reference plane is the plane where the measurement beam 134 and the reference beam 124 have equal optical pathlength. The target surface 171 is arranged at a target surface distance 178, 179 from the second detector 173 that differs from the reference surface distance 178 by a target surface difference 179.

The reference spectral coherence pulse 181 at the first detector 163 may e.g. occur when the first reference beam 124 and the first measurement beam 134 have travelled the same distance when they arrive at the first detector 163. That is, the length of the optical path that the first reference beam 124 and the first measurement beam 134 have travelled may the same when the reference spectral coherence pulse 181 occurs. Likewise, the measurement spectral coherence pulse 182 at the second detector 173 may e.g. occur when the second reference beam 127 and the second measurement beam 137 have travelled the same distance when they arrive at the second detector 173. Since the first measurement beam path includes the reference axis path 135, 136 and the second measurement beam path includes the measurement axis path 138, 139, the reference beam path 120 may e.g. be adapted to have a length that is greater than the measurement beam path 130.

The interferometer system 100 may in embodiments comprise the reference variable delay path 190, which is part of the reference beam path 120. The first 124 and second reference beam 127 travel through the reference variable delay path 190, but the first 134 and second measurement beam 137 do not. The delay length of the reference variable delay path 190 can be controlled by the delay path controller 195, which may e.g. control the position of a moveable reflective element 191. The reference variable delay path 190 may e.g. be a suitable optical delay line. It is also possible that the reference variable delay path comprises a stretchable fiber which can be stretched to change the delay length.

The interferometer system 100 may in embodiments comprise the measurement variable delay path 142, which is part of the measurement beam path 142. The measurement variable delay path 142 can be embodied in similar ways as the reference variable delay path 190. In the shown embodiment the delay path controller 195 controls both the reference variable delay path 190 and the measurement variable delay path 142, but it is also possible to provide separate delay path controllers. In embodiments, the measurement variable delay path 142 and the reference variable delay path 190 may both be embodied as stretchable fibres, being adapted to be stretched in mutually opposite directions.

The measurement variable delay path 142 and the reference variable delay path 190 can be used to control the lengths of the measurement beam path 130 and the reference beam path 120, respectively. As such, the reference spectral coherence pulse 181 can be created when the delay length of the reference variable delay path 190 and the delay length of the measurement variable delay path 142 correspond with the reference coherence arrangement. The measurement spectral coherence pulse 182 can be created when the delay length of the reference variable delay path 190 and the delay length of the measurement variable delay path 142 correspond with the measurement coherence arrangement. It will be appreciated that, in practice, it is possible to provide only one of the measurement variable delay path 142 and the reference variable delay path 190.

FIG. 4a schematically illustrates the moveable reflective element 191 of the reference variable delay path 190 in two configurations, a first configuration being when the delay length corresponds to the reference coherence arrangement 192 and a second configuration being when the delay length corresponds to the measurement coherence arrangement 193. In this example, the moveable reflective element 143 of the measurement variable delay path 143 is kept in the same position. As such, a delay path difference 123 between the reference coherence arrangement 192 and the measurement coherence arrangement 193 corresponds to the target surface difference 179.

FIG. 4c illustrates, among others, the reference coherence signal 163a and the measurement coherence signal 173a as they may e.g. be received by the control unit 201. In the reference coherence signal 163a the reference spectral coherence pulse 181 can be seen, and in the measurement coherence signal 173a the measurement spectral coherence pulse 182 can be seen. The control unit 201 can be configured to detect from the reference coherence signal 163a when the delay lengths of the reference variable delay path 190 and the measurement variable delay path 142 correspond to the reference coherence arrangement 192, and from the measurement coherence signal 173a when the delay lengths correspond to the measurement coherence arrangement 193. Based on this, the zero-position of the target surface 171 can be determined, e.g. as the position of the target surface 171 at which the measurement spectral coherence pulse 182 occurred. After determining the zero-position, the interferometer system 100 can further be used to determine the position of the target surface 171 relative to said zero-position.

For example, in the shown embodiment the target surface difference 179 corresponds to the delay path difference 123. The zero-position can thus be determined relative to the reference surface 161. It is possible that the target surface 161 may be at a fixed and known absolute position, thereby allowing to determine the zero-position of the target surface 171 as an absolute position. It is also possible that the reference surface 161 is not at a fixed position, but that it is sufficient to determine the zero-position of the target surface 171 relative to the reference surface 161.

The skilled person will appreciate that the applied technique with the reference variable delay path 190 and/or the measurement variable delay path 142 in some embodiments resembles a time domain Optical Coherent Tomography (OCT) technique. However, known time domain OCT techniques are only suitable for short-range measurements, since the range of the variable delay path should correspond to a length of the measurement axis path. By providing the reference axis path 160 and determining the zero-position relative to the reference surface 161, the inventors have been able to use the interferometer system 100 for long-range measurements. For example, in practice the reference axis path 135, 136 and/or the measurement axis path 138, 139 may have length in the order of magnitude of a meter, e.g. being 0.5-1.5 m. Conventional OCT techniques are only used for measurements of at maximum a few hundred mm.

In embodiments, the interferometer system 100 comprises a reference beam path delay 121 for increasing a length of the reference beam path 120 relative to a length of the measurement beam path 130. Alternatively, the reference beam path delay 121 may be used for decreasing a length of the reference beam path 120 relative to a length of the measurement beam path 130. The reference beam path delay 121 may e.g. be a fixed length of fibre through which the first 124 and second reference beam 127 travel. A length of the reference beam path delay 121 may e.g. be in the same order of magnitude as or approximately correspond to twice the reference surface distance 178. The reference beam path delay 121 allows that the reference variable delay path 190 and/or measurement variable delay path 142 can be provided having a relatively small range, even though the reference axis path 135, 136 and the measurement axis path 138, 139 are relatively long, thereby enabling use of the interferometer system 100 for long-range measurements.

In embodiments, the interferometer system 100 comprises a broadband light source 102 configured to emit broadband radiation 112 forming at least a part of the first 134 and second measurement beam 137 and the first 124 and second reference beam 127. For example, during operational use, the broadband radiation 112 emitted by broadband radiation source 102 is adapted to cause the reference spectral coherence pulse 181 and the measurement spectral coherence pulse 182. The control unit 201 may be a signal processing unit to convert raw interference data from first detector 163 and second detector 173 into a displacement signal, to detect a coherence pulse. Optionally, the control unit 201 is configured to determine a measurement coherence time 213 at which the target surface 171 is at the zero-position based on the broadband radiation 112, e.g. based on the occurrence of the measurement spectral coherence pulse 182. For example, the broadband light source 102 may comprise one or more Light Emitting Diodes (LED), for example Superluminescent Light Emitting Diodes (sLED), e.g. emitting radiation in a wavelength range with a bandwidth of 20-50 nm. For example, two sLED emitting radiation at mutually different wavelengths may be combined.

In embodiments, the interferometer system 100 comprises a narrowband light source 102 configured to emit narrowband radiation 111 forming at least a part first 134 and second measurement beam 137 and the first 124 and second reference beam 127. The narrowband light source 102 may e.g. comprise a laser source, e.g. configured to emit radiation at 633 nm or 1550 nm.

In embodiments, the delay path controller 195 is configured to, during operational use; adapt the delay lengths at least until the reference spectral coherence pulse 192 and the measurement spectral coherence pulse 193 have occurred. The control unit 201 is configured to determine the zero-position of the target surface 171 based on the narrowband radiation received by the first detector 163 and/or second detector 173 and/or a first reference detector 151 between a reference coherence time 212 and a measurement coherence time 213. For example, as can be seen in FIG. 4a, in the shown embodiment the interferometer system 100 comprises a first reference detector 151 configured to receive first 134 and second measurement beam 137 and the first 124 and second reference beam 127, upstream of the beam splitter 145. FIG. 4b shows that the control unit 201 is configured to receive a first reference detector signal 151a from the first reference detector 151, and the first reference detector signal 151a is illustrated in FIG. 4c. The control unit 201 may e.g. detect the reference spectral coherence pulse 181 at the reference coherence time 212, and the measurement spectral coherence pulse 182 at the measurement coherence time 213, which is a difference period 211 later. At the location of the first reference detector 151, there is no coherence of broadband radiation. The first reference detector signal 151a therefore shows pulses of the narrowband radiation, which is stable at a known wavelength. Based on the number of pulses that are detected between the reference coherence time 212 and the measurement coherence time 213, the difference period 211 can be determined accurately, and thus the zero-position of the target surface 171.

For example, when the reference surface 161 and the target surface 171 are stationary, e.g. absolute or relatively to each other, said number of pulses is proportional to distance of the zero-position relative to the reference surface 161. However, if the reference surface 161 and/or the target surface 171 are moving, it will be appreciated that their respective movements between the reference coherence time 212 and the measurement coherence time 213 should be taken into account.

The invention further advantageously allows setting the zero-position as desired. For example, the delay path controller 195 can be configured to control the measurement coherence arrangement 193 based on a desired zero-position. The delay path controller 195 e.g. may comprise an input terminal for receiving the desired zero-position. By setting the zero-position of the target surface 171 as desired, the zero-position can be chosen to correspond to a position that the target surface 171 already is in or will be in because of other reasons. Thus, there is no need to move the target surface 171 in to a particular position solely for setting the zero-position. This may reduce the required time and as such improve the throughput e.g. in a lithographic process.

FIG. 4b further shows that the control unit 201 is optionally configured to be connected to the delay path controller 195 for receiving and/or sending a delay path signal 195a.

For example, the delay path signal 105a may comprise information relating to the delay lengths of the reference variable delay path 190 and/or the measurement variable delay path 142. It is also possible that the control unit 201 is configured to send instructions to the delay path controller 195 for controlling the delay length, e.g. including the desired zero-position. In embodiments, the delay path controller 195 may be integrated in the control unit 201.

FIG. 4b further shows that the control unit 201 comprises a communication terminal 201.1 for receiving and/or sending the delay path signal 195a from/to communication terminal 195.1; an input terminal 201.2 for receiving the first reference detector signal 151a from output terminal 151.1; an input terminal 201.3 for receiving the reference coherence signal 163a from output terminal 163.1; and an input terminal 201.4 for receiving the measurement coherence signal 173a from output terminal 173.1. The delay path controller 195 may comprise an output terminal 195.2 for sending a control signal 195b to an input terminal 190.1 of the reference variable delay path 190, and/or an output terminal 195.3 for sending a control signal 195c to an input terminal 142.1 of the measurement variable delay path 142.

In the shown example, the broadband radiation 112 emitted by broadband radiation source 102 and the narrowband radiation 111 emitted by the narrowband radiation source 101 are combined into combined radiation 113. The interferometer system 100 comprises a beam splitter 141 configured to split the combined radiation 113 into the first 134 and/or second measurement beam 137 and the first 124 and/or second reference beam 127. The interferometer system 100 further comprises an optical combiner 144 for combining the first measurement beam 134 and the first reference beam 124 into a single coherent signal, as well as the second measurement beam 137 and the second reference beam 127.

Figure 5:
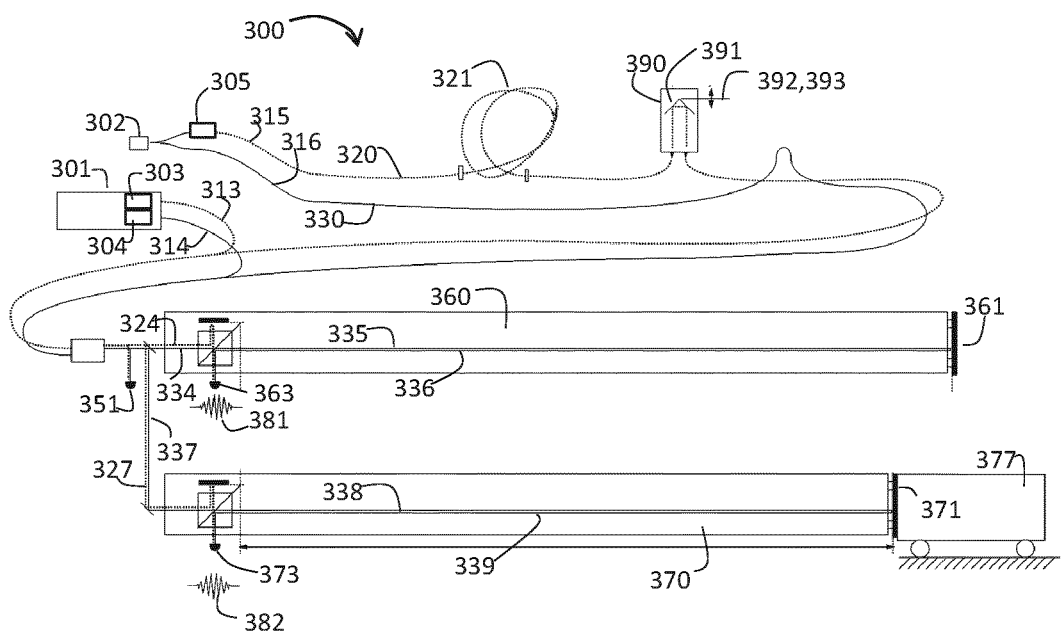
FIG. 5 schematically illustrates an interferometer system according to a second embodiment of the invention.

The skilled person will appreciate that although in the embodiment illustrated in FIG. 4-4c homodyne detection is applied, the invention is not limited thereto. FIG. 5 shows an interferometer system 300 according to a second embodiment of the invention. The interferometer system 300 in this embodiment also comprises a first detector 363 configured to receive a first reference beam 324 and a first measurement beam 334, and a second detector 373 configured to receive a second reference beam 327 and a second measurement beam 337. The first measurement beam 334 is e.g. guided by a first beam guiding module to travel along a reference axis 360. The second measurement beam 337 is e.g. guided by a second beam guiding module to travel along a measurement axis 370. The interferometer system 300 further comprises a reference variable delay path 390, which is part of a reference beam path 320. Although not shown in FIG. 5, it will be appreciated that the interferometer system 300 comprises a delay path controller and a control unit configured to determine the zero-position of the target surface 371. The zero-position is determined based on a reference coherence signal and a measurement coherence signal, and based on a reference coherence arrangement 392 causing a reference spectral coherence pulse 381 and a measurement coherence arrangement 393 causing a measurement spectral coherence pulse 382 and/or a delay path difference. In the shown example, the interferometer system 300 also comprises an optional reference beam path delay 321. The interferometer system 300 does not comprise a measurement variable delay path in this example, but may in embodiments.

FIG. 5 illustrates that in embodiments, the interferometer system 300 comprises a narrowband modulator 303, 304 configured to modulate narrowband radiation 314 forming part of the first 334 and second measurement beam 337 to be at a shifted frequency or phase relative to narrowband radiation 313 forming part of the first 324 and second reference beam 334. A frequency shift between a measurement beam and a reference beam and a reference beam allows for heterodyne phase detection. A modulating phase shift between a measurement beam and a reference beam with a certain modulation frequency would also allow phase demodulation. When multiple sources are mixed, each source requires a unique modulation frequency. In the shown example, the interferometer system 300 comprises a first narrowband modulator 303 for modulating the narrowband radiation 313 forming part of the first 324 and second reference beam 327, and a second narrowband modulator 304 for modulating the narrowband radiation 314 forming part of the first 334 and second measurement beam 337. By modulating the narrowband radiation 313, 314, the control unit can apply heterodyne detection for determining the reference spectral coherence pulse 381 and the measurement spectral coherence pulse 382. This may have several advantages, such as a more robust detection of the coherence and a better separation between the broadband and narrowband radiation. It can also reduce signal crosstalk near the detection point of reference spectral coherence pulse and the measurement spectral coherence pulse. Furthermore, with heterodyne detection the phase and amplitude of a coherence pulse of the reference spectral coherence pulse or the measurement spectral coherence pulse can be detected by analysing the phase and amplitude of the shifted frequency or phase instead of directly detecting the shape of the coherence pulse. Maximum amplitude detection can be used to determine the global center of the coherence pulse and the phase measurement can be used to refine the accuracy of finding the center and can form a more simplified signal for phase locking when maintaining a constant optical distance. The first narrowband modulator 303 and/or the second narrowband modulator 304 may e.g. comprise a Zeeman-split laser and/or frequency shifters.

In embodiments, the delay path controller is configured to maintain the delay length at the reference coherence arrangement 392. The control unit is configured to determine the zero-position of the target surface 371 based on a length of measurement axis path 338, 339 being equal to a length of the reference axis path 335, 336 when the measurement spectral coherence pulse 382 is detected. In this embodiment, the delay length is kept substantially constant after the reference spectral coherence pulse 381 is detected. For example, the interferometer system 300 may comprise a lock for locking the moveable reflective surface 391 of the reference variable delay path 390. Accordingly, a phase and/or amplitude lock is applied to reference spectral coherence pulse 381. The target surface 371 can now be moved. For example, FIG. 5 shows that the target surface 371 can be part of the a substrate support 377 on which e.g. a substrate can be arranged that is adapted to be subjected to a lithographic process, a metrology process, or an inspection process. In such processes, the substrate support 377 may be moved as part of the process, e.g. to arrange the substrate support 377 in a starting position in the beginning of the process. During said movement, the target surface 371 will pass the position at which the length of the measurement axis path 338, 339 is equal to the length of the reference axis path 335, 336. At that moment, the measurement spectral coherence pulse 382 will occur at the second detector 373. The measurement coherence arrangement 393 is thus equal to the reference coherence arrangement 392. The zero-position of the target surface 371 can be determined, e.g. relative to the reference surface 361.

In embodiments, the narrowband light source 301 is configured to add the narrowband radiation 313, 314 to the reference beam path 320 downstream of the reference variable delay path 390 and/or to the measurement beam path 330 downstream of the measurement variable delay path (when present). This way, the narrowband radiation 313, 314 does not travel through the reference variable delay path 390, which may be advantageous for reducing power losses of the narrowband radiation 313, 314. The reference spectral coherence pulse 381 and the measurement spectral coherence pulse 382 are determined by the broadband radiation. The narrowband radiation 313 of the first 324 and second reference beam 327 does not need to have travelled the same distance as the narrowband radiation 314 of the first 334 and second measurement beam 337, respectively, when arriving at the first 363 and second detector 373, respectively. In this embodiment, it may in particular be advantageous to control the delay path 390 to stay at the reference coherence arrangement 392, to avoid that potential drift of the delay path 390 affects the distance travelled by the first 324 and/or second reference beam 327. In other words, phase and/or amplitude lock to reference spectral coherence pulse 381 is used to maintain a constant delay path difference between the reference coherence arrangement and the measurement coherence arrangement.

In embodiments, the interferometer system 300 comprises a broadband modulator 305 configured to modulate broadband radiation 316 from broadband radiation source 302 and forming part of the first 334 and second measurement beam 337 to be at a shifted frequency or phase relative to broadband radiation 315 forming part of the first 324 and second reference beam 327. In this embodiment, heterodyne detection is also provided for the broadband radiation 315, 316. This may simplify the detection of the reference spectral coherence pulse and the measurement spectral coherence pulse. In embodiments wherein both broadband modulator 305 and narrowband modulators 303, 304 are provided, it may be required that the frequency differences are different to allow easy detection of the respective radiation.

In embodiments, the interferometer system 300 comprises a first reference detector 351 configured to receive the first 334 and/or second measurement beam 337, and to receive the first 324 and/or second reference beam 327. The first reference detector 351 is arranged downstream of the reference variable delay path 390 and/or the measurement variable delay path, when present.

Figure 6:
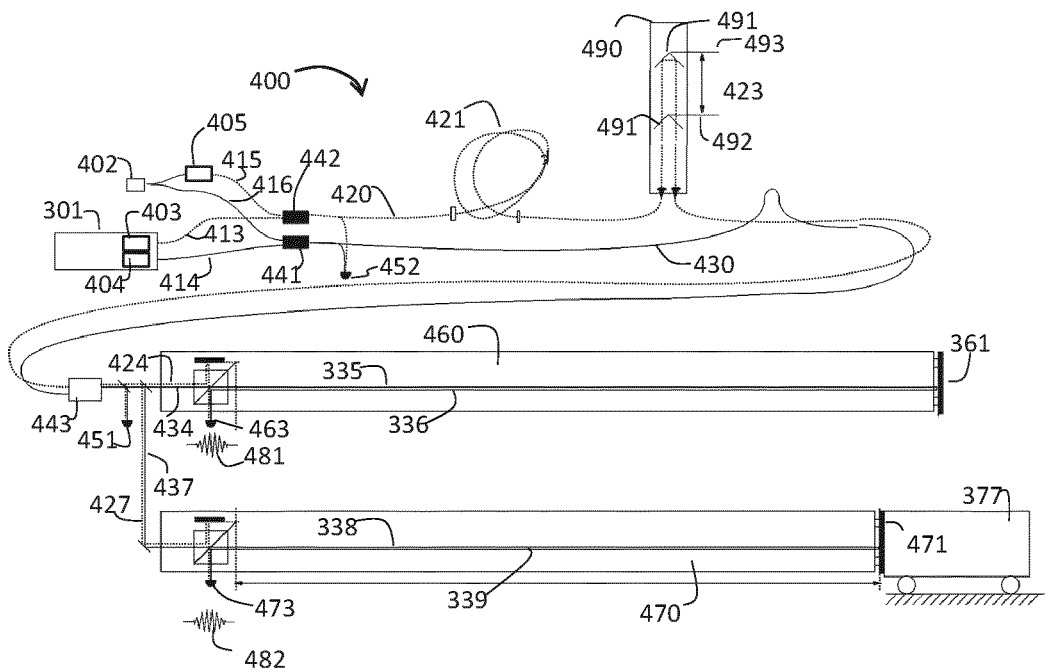
FIG. 6 schematically illustrates an interferometer system according to a third embodiment of the invention.

FIG. 6 shows an interferometer system 400 according to a third embodiment of the invention. The interferometer system 400 in this embodiment also comprises a first detector 463 configured to receive a first reference beam 424 and a first measurement beam 434, and a second detector 473 configured to receive a second reference beam 427 and a second measurement beam 437. The interferometer system 400 further comprises a reference variable delay path 490 that is part of a reference beam path 420. The first measurement beam 434 is e.g. guided by a first beam guiding module to travel along a reference axis 460. The second measurement beam 437 is e.g. guided by a second beam guiding module to travel along a measurement axis 470. The delay length of the reference variable delay path 490 can be controlled by a delay path controller (not shown), which may e.g. control the position of a moveable reflective element 491. Reference beam path 420 and measurement beam path 430 represent the beam delivery towards optical combiner 443. Although not shown in FIG. 6, it will be appreciated that the interferometer system 400 comprises a delay path controller and a control unit configured to determine the zero-position of the target surface 471. The zero-position is determined based on a reference coherence signal and a measurement coherence signal, and based on a reference coherence arrangement 492 causing a reference spectral coherence pulse 481 and a measurement coherence arrangement 493 causing a measurement spectral coherence pulse 482 and/or a delay path difference 423. In the shown example, the interferometer system 400 also comprises an optional reference beam path delay 421. The interferometer system 400 does not comprise a measurement variable delay path in this example, but may in embodiments.

The interferometer system 400 in FIG. 6 also comprises a broadband modulator 405 configured to modulate broadband radiation 416 from broadband radiation source 402 and, a first narrowband modulator 403 and a second narrowband modulator 404. Different from the embodiment shown in FIG. 5, the narrowband radiation 413 in FIG. 6 is added to the first 424 and second reference beam 427 upstream of the reference variable delay path 490 and/or the measurement variable delay path, when present. In the shown example, the interferometer system 400 comprises a first beam combiner 442 for combining narrowband radiation 413 and broadband radiation 415 into the first 424 and second reference beam 427. The interferometer system 400 further comprises a second beam combiner 441 for combining narrowband radiation 414 and broadband radiation 414 into the first 434 and second measurement beam 437.

In embodiments, the interferometer system 400 comprises a first reference detector 451 configured to receive the first 434 and/or second measurement beam 437, and to receive the first 424 and/or second reference beam 427. The first reference detector 451 is arranged downstream of the reference variable delay path 490 and/or the measurement variable delay path, when present.

In embodiments, the interferometer system 400 comprises a second reference detector 452 configured to receive the first 434 and/or second measurement beam 437, and to receive the first 424 and/or second reference beam 427. The second reference detector 452 is arranged upstream of the reference variable delay path 490 and/or the measurement variable delay path, when present. The control unit is configured to receive a first reference detector signal from the first reference detector 451, and to receive a second reference detector signal from the second reference detector 452. The control unit is further configured to determine the delay length based on the first reference detector signal and the second reference detector signal. For example, a phase difference between the narrowband radiation detected at the first reference detector 451 and the narrowband radiation detected at the second reference detector 452 may be a measure for a change in the reference variable delay path 490. This embodiment can e.g. be used to change the zero-position of the target surface 471, wherein the control unit determines the delay length based on the first reference detector signal and the second reference detector signal in the new zero-position.

Figure 7:
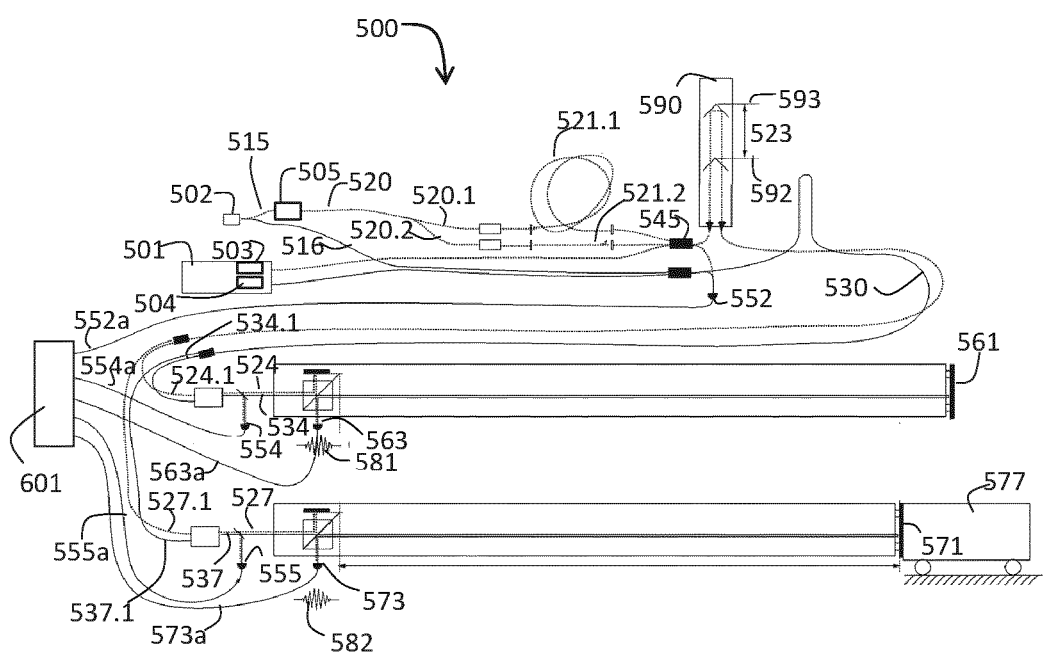
FIG. 7 schematically illustrates an interferometer system according to a fourth embodiment of the invention.

FIG. 7 shows an interferometer system 500 according to a fourth embodiment of the invention. The interferometer system 500 comprises the reference variable delay path 590, which is part of the reference beam path 520. The interferometer system 500 does not comprise a measurement variable delay path in this example, but may in embodiments. A first measurement beam 534 travels through a measurement beam path 530 and to a reference surface 561 and back. When the reference variable delay path 590 is at a reference coherence arrangement, a reference spectral coherence pulse 581 of the first measurement beam 534 and a first reference beam 524 occurs at a first detector 563. A second measurement beam 537 travels through the measurement beam path 530 and to a target surface 571 that is part of a moveable object 577 such as a stage apparatus, and back. When the reference variable delay path 590 is at a measurement coherence arrangement, a measurement spectral coherence pulse 582 of the second measurement beam 537 and a second reference beam 527 occurs at a second detector 573. The interferometer system 500 in this example comprises a broadband radiation source 502 and a narrowband source 501, as well as a first narrowband modulator 503, a second narrowband modulator 504, and a broadband modulator 505. Broadband modulator 505 is configured to modulate broadband radiation 516 forming part of the first 534 and second measurement beam 537 to be at a shifted frequency or phase relative to broadband radiation 515 forming part of the first 524 and second reference beam 527. Although not shown in FIG. 7, it will be appreciated that the interferometer system 500 comprises a delay path controller. The interferometer system 500 comprises a control unit 601 configured to determine the zero-position of the target surface 571. The zero-position is determined based on a reference coherence signal and a measurement coherence signal, and based on a reference coherence arrangement 592 and the measurement coherence arrangement 593 and/or a delay path difference 523.

In embodiments, the reference beam path 520 comprises a longer delayed beam path 521.1 configured to guide a longer delayed beam 520.1, and a shorter delayed beam path 521.2 configured to guide a shorter delayed beam 520.2. The longer delayed beam path 521.1 has a length that is greater than a length of the shorter delayed beam path 521.2. In the shown example, the reference beam path 520 is configured to split the first 524 and/or second reference beam 527 in a longer delayed beam 520.1 and a shorter delayed beam 520.2. The interferometer system 500 further comprises a reference beam combiner 545 arranged downstream of the longer delayed beam path 521.1 and the shorter delayed beam path 521.2. The reference beam combiner 545 is configured to combine the longer delayed beam 520.1 and the shorter delayed beam 520.2. Thus, in this example, the longer delayed beam 520.1 and the shorter delayed beam 520.2 are combined to travel simultaneously. In other examples, the interferometer system 500 may be configured to switch between the longer delayed beam 520.1 and the shorter delayed beam 520.2, e.g. using a switchbox.

In embodiments, the interferometer system 500 comprises a first reference beam fibre 524.1 for the first reference beam 524, a first measurement beam fibre 534.1 for the first measurement beam 534, a second reference beam fibre 527.1 for the second reference beam 527, and a second beam fibre 537.1 for the second measurement beam 537. Thus, a separate fibre for each beam is provided. Accordingly, the situation exists that different optical pathlength differences will exist between the reference beam delivery beam path and the measurement beam delivery beam path. The use of a reference axis reference detector 554 and a measurement axis reference detector 555 enables measurement of the variable delay line change to represent the fiber length mismatch difference.

The interferometer system 500 further comprises a reference axis reference detector 554 configured to receive first measurement beam 534 and the first reference beam 524, downstream of the first measurement beam fibre 534.1 and the first reference beam fibre 524.1. Optionally, the interferometer system 500 further comprises a measurement axis reference detector 555 configured to receive the second measurement beam 537 and the second reference beam 527, downstream of the second measurement beam fibre 537.1 and the second reference beam fibre 527.1. The interferometer system 500 further comprises a common reference detector 552 configured to receive the first 527 and second measurement beam 537 and the first 524 and second reference beam 527, upstream of the first measurement beam fibre 534.1, the first reference beam fibre 524.1, the second measurement beam fibre 537.1 and the second reference beam fibre 527.1. In this example, the common reference detector 552 is also arranged upstream of the reference variable delay path 590. For the case of a heterodyne interferometer, common reference detector 552 acts as a reference signal for determining the optical pathlength difference change of the variable delay line if the shorter delayed beam path 521.2 is exactly matched with broadband radiation 516, such that the optical pathlength from the source to the detector is identical. This may be difficult to accomplish and hence the control signal of the broadband may be used as a reference signal instead when trying to measure a phase for the broadband source.

FIG. 7 further illustrates that, in embodiments, the control unit 601 is configured to receive one or more of: a reference coherence signal 563*a* from the first detector 563; a measurement coherence signal 573*a* from the second detector 573; a reference axis reference detector signal 554*a* from the reference axis reference detector 554; a measurement axis reference detector signal 555*a* from the measurement axis reference detector 555; common reference detector signal 552*a* from the common reference detector 552. It will be appreciated that in practice said components may comprise input terminals and output terminals for receiving and transmitting said signals.

In practice, when a separate fibre 524.1, 527.1, 534.1, 537.1 for each beam fibre 524, 527, 534, 537 is provided, such as shown in the example in FIG. 7, each fibre 524.1, 527.1, 534.1, 537.1 may cause drift. By providing the shorter delayed beam path 521.1, the shorter delayed beam 520.2 causes coherence in the reference axis reference detector 554 and/or the measurement axis reference detector 555. The control unit 601 can e.g. be configured to determine a difference in length of the first reference beam fibre 524 and the first measurement beam fibre 534.1 relative to the second reference beam fibre 527.1 and the second beam fibre 537.1 based on the delay lengths at which coherence occurs in the reference axis reference detector 554 and the measurement axis reference detector 555. The control unit 601 can further be configured to take said difference in length into account when determining the zero-position of the target surface 571.

Figure 8:
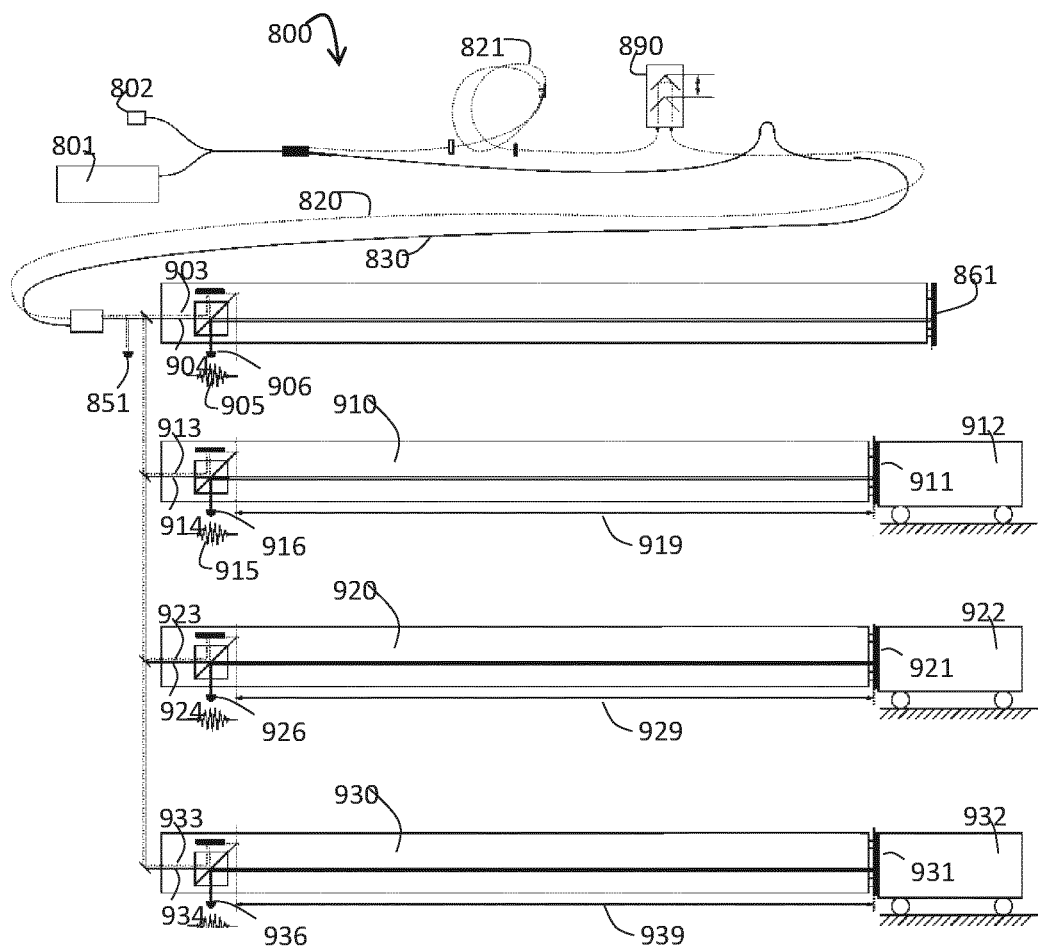
FIG. 8 schematically illustrates an interferometer system according to a fifth embodiment of the invention.

Although described above with reference to a single target surface, it will be appreciated that the interferometer systems according to the invention can be applied for determining the position of a plurality of target surfaces. FIG. 8 shows an example of such an interferometer system 800. The interferometer system 800 comprises the reference variable delay path 890 and the optional reference path delay 821, which are part of the reference beam path 820. The interferometer system 800 does not comprise a measurement variable delay path in this example, but may in embodiments. A first measurement beam 904 travels through a measurement beam path 830 and to a reference surface 861 and back. When the reference variable delay path 890 is at a reference coherence arrangement, a reference spectral coherence pulse 905 of the first measurement beam 904 and a first reference beam 903 occurs at a first detector 906. A second measurement beam 914 is adapted to travel a respective measurement beam path including the measurement beam path 830 and a measurement axis path 910, determined by a target surface 911. When the reference variable delay path 890 is at a measurement coherence arrangement, a measurement spectral coherence pulse 915 of the second measurement beam 914 and a second reference beam 913 occurs at a second detector 916. The interferometer system 800 in this example comprises a broadband radiation source 802 and a narrowband source 801, and in embodiments one or more narrowband modulators or broadband modulators may be provided. In this example the absolute distance measurement is not relative to the optical reference plane of an interferometer, but is relative to the optical pathlength difference of a reference interferometer to reference surface 861. Although not used in this example, the interferometer system 800 may also comprise an optional first reference detector 851 in case at least the narrow band source would be used as a heterodyne interferometer system. Although not shown, the interferometer system 800 also comprises a control unit and a delay path controller.

In embodiments, the interferometer system 800 comprises one or more further detectors 926, 936, each configured to receive a respective further reference beam 923, 933 that is adapted to travel a respective further reference beam path including the reference beam path 820. Each further detector 926, 936 is further configured to receive a respective further measurement beam 924, 934 that is adapted to travel a respective further measurement beam path including the measurement beam path 830 and a respective further measurement axis path 920, 930 determined by a respective further target surface 921, 932. The control unit is configured to receive a further measurement coherence signal from each further detector 926, 936. The control unit is configured to determine a zero-position of each respective further target surface 921, 931 based the reference coherence signal and the respective further measurement coherence signal, and the reference coherence arrangement and a respective further measurement coherence arrangement and/or a respective further delay path difference between the reference coherence arrangement and the respective further measurement coherence arrangement.

In the shown example, the further detectors 926, 936 include a first further detector 926 and a second further detector 936. The further measurement beams 924, 934 include a first further measurement beam 924 and a second further measurement beam 934. The further reference beams 923, 933 include a first further reference beam 923 and a second further reference beam 933. The further measurement axis paths 920, 930 include a first further measurement axis path 920 and a second further measurement axis path 930. The further target surfaces 921, 932 include a first further target surface 921 and a second further target surface 932. Although in this example two further detectors 926, 936 and corresponding features are shown, it will be appreciated that in practice any number can be provided, e.g. one, two, three, four, five, ten, or twenty.

In this embodiment, the interferometer system 800 can be used to determine the zero-position of multiple target surfaces 911, 921, 931. In the shown example, target surface 911 is part of a moveable object 912, the first further target surface 921 is part of a first further moveable object 922 and the second further target surfaces 931 is part of a third moveable object 932. The moveable objects 912, 922, 932 may e.g. be different components of a lithographic apparatus. It is also possible that the target surfaces 911, 921, 931 are part of a single moveable object, e.g. a stage apparatus, and e.g. that each target surface 911, 921, 931 is used to determine the position of the moveable object in another degree of freedom, e.g. along another axis.

In embodiments, the control unit is configured to determine the zero-position of the target surface by applying time domain optical coherence tomography. The interferometer systems according to the invention allow using time domain optical coherence tomography for long-range measurements.

The invention further relates to a stage apparatus, comprising the interferometer system for determining a position of a target surface according to the invention, and an object holder configured to hold an object, wherein the object holder comprises the target surface. For example, the stage apparatus may be part of lithographic apparatus, e.g. as the lithographic apparatus LA shown in FIG. 1-2, a metrology apparatus, or an inspection apparatus. The object holder may e.g. be a substrate support WT. The object may e.g. be or comprise a substrate W, and e.g. be adapted to be subjected to a lithographic process, a metrology process, or an inspection process. The target surface may e.g. be arranged on a side surface of the object holder.

The invention further relates to a lithographic apparatus LA, e.g. as shown in FIG. 1-2, comprising the interferometer system for determining a position of a target surface according to the invention. The lithographic apparatus LA further comprises a mask support MT for holding a patterning device MA having a pattern, and a projection system PS for projecting the pattern onto an object W comprising substrate. The lithographic apparatus LA further comprises an object holder, e.g. a substrate support WT configured to hold an object W, wherein the object holder comprises the target surface.

Although specific reference may be made in this text to the use of a lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

Where the context allows, embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic storage media; optical storage media; flash memory devices; electrical, optical, acoustical or other forms of propagated signals (e.g. carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. and in doing that may cause actuators or other devices to interact with the physical world.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An interferometer system for determining a position of a target surface, wherein the interferometer system comprises:
   a first detector configured to receive a first reference beam that is adapted to travel a first reference beam path including a reference beam path, and receive a first measurement beam that is adapted to travel a first measurement beam path including a measurement beam path and a reference axis path determined by a reference surface;
   a second detector configured to receive a second reference beam that is adapted to travel a second reference beam path including the reference beam path, and receive a second measurement beam that is adapted to travel a second measurement beam path including the measurement beam path and a measurement axis path determined by the target surface; and
   a delay path controller configured to adapt a delay length of: a reference variable delay path which is part of the reference beam path, or a measurement variable delay path which is part of the measurement beam path, or both the reference variable delay path and measurement variable delay path,
   wherein during operational use:
      a reference spectral coherence pulse of the first reference beam and the first measurement beam occurs at the first detector for the delay length that corresponds to a reference coherence arrangement, and
      a measurement spectral coherence pulse of the second reference beam and the second measurement beam occurs at the second detector for the delay length that corresponds to a measurement coherence arrangement; and
   a control unit configured to:
      receive a reference coherence signal from the first detector, and a measurement coherence signal from the second detector; and
      determine a zero-position of the target surface based:
         on the reference coherence signal and the measurement coherence signal; and
         on the reference coherence arrangement and the measurement coherence arrangement, or a delay path difference between the reference coherence arrangement and the measurement coherence arrangement, or the reference coherence arrangement, the measurement coherence arrangement and the delay path difference.

2. The interferometer system according to claim 1, further comprising a reference beam path delay for increasing or decreasing a length of the reference beam path relative to a length of the measurement beam path.

3. The interferometer system according to claim 1, further comprising a broadband radiation source configured to emit broadband radiation forming at least a part of the first and second measurement beam and the first and second reference beam,
   wherein, during operational use, the broadband radiation emitted by the broadband radiation source is adapted to cause the reference spectral coherence pulse and the measurement spectral coherence pulse.

4. The interferometer system according to claim 1, further comprising a narrowband radiation source configured to emit narrowband radiation forming at least a part of the first and second measurement beam and the first and second reference beam.

5. The interferometer system according to claim 4,
   wherein the delay path controller is configured to, during operational use, adapt the delay length at least until the reference spectral coherence pulse and the measurement spectral coherence pulse have occurred; and
   wherein the control unit is configured to determine the zero-position of the target surface based on the narrowband radiation received by:
      the first detector, or
      the second detector, or
      a first reference detector between a reference coherence time and a measurement coherence time, or
      any combination selected from: the first detector, the second detector or the first reference detector between the reference coherence time and the measurement coherence time.

6. The interferometer system according to claim 4, further comprising a narrowband modulator configured to modulate the narrowband radiation forming part of the first and second measurement beam to be at a shifted frequency or phase relative to the narrowband radiation forming part of the first and second reference beam.

7. The interferometer system according to claim 6, wherein the delay path controller is configured to maintain the delay length at the reference coherence arrangement, and
   wherein the control unit is configured to determine the zero-position of the target surface based on the length of the measurement axis path being equal to a length of the reference axis path when the measurement spectral coherence pulse is detected.

8. The interferometer system according to claim 6, wherein the narrowband light source is configured to add the narrowband radiation to:
   the reference beam path downstream of the reference variable delay path, or
   the measurement beam path downstream of the measurement variable delay path, or
   both the reference beam path downstream of the reference variable delay path and the measurement beam path downstream of the measurement variable delay path.

9. The interferometer system according to claim 3, further comprising a broadband modulator configured to modulate the broadband radiation forming part of the first and second measurement beam to be at a shifted frequency or phase relative to the broadband radiation forming part of the first and second reference beam.

10. The interferometer system according to claim 1, further comprising a first reference detector configured to receive:
the first measurement beam, or the second measurement beam, or both the first measurement beam and second measurement beam; and
the first reference beam, or the second reference beam, or both the first reference beam and the second reference beam,
wherein the first reference detector is arranged downstream of:
the reference variable delay path, or
the measurement variable delay path, or
both the reference variable delay path and measurement variable delay path.

11. The interferometer system according to claim 10, further comprising a second reference detector configured to receive:
the first measurement beam, or the second measurement beam, or both the first measurement beam and second measurement beam; and
the first reference beam, or the second reference beam, or both the first reference beam and second reference beam,
wherein the second reference detector is arranged upstream of:
the reference variable delay path, or
the measurement variable delay path, or
both the reference variable delay path and measurement variable delay path; and
wherein the control unit is configured to:
receive a first reference detector signal from the first reference detector;
receive a second reference detector signal from the second reference detector; and
determine the delay length based on the first reference detector signal and the second reference detector signal.

12. The interferometer system according to claim 11, wherein the reference beam path comprises a longer delayed beam path configured to guide a longer delayed beam, and a shorter delayed beam path configured to guide a shorter delayed beam, and
wherein the longer delayed beam path has a length that is greater than a length of the shorter delayed beam path.

13. The interferometer system according to claim 1, further comprising one or more further detectors, each configured to receive:
a respective further reference beam that is adapted to travel a respective further reference beam path including the reference beam path, and
a respective further measurement beam that is adapted to travel a respective further measurement beam path including the measurement beam path and a respective further measurement axis path determined by a respective further target surface; and
wherein the control unit is configured to determine a zero-position of each respective further target surface based:
on the reference coherence signal and a respective further measurement coherence signal; and
on the reference coherence arrangement and a respective further measurement coherence arrangement, or a respective further delay path difference between the reference coherence arrangement and the respective further measurement coherence arrangement, or the reference coherence arrangement, the respective further measurement coherence arrangement, and the respective further delay path difference.

14. The interferometer system according to claim 1, wherein the control unit is configured to determine the zero-position of the target surface by applying time domain optical coherence tomography.

15. A stage apparatus, comprising:
the interferometer system according to claim 1, and
an object holder configured to hold an object, wherein the object holder comprises the target surface.

16. A lithographic apparatus comprising:
the interferometer system according to claim 1,
a mask support configured to hold a patterning device having a pattern,
a projection system configured to project radiation corresponding to the pattern onto an object, and
an object holder configured to hold the object, wherein the object holder comprises the target surface.

17. A method using the interferometer system of claim 1, the method comprising:
receiving the first reference beam and the first measurement beam at the first detector;
receiving the second reference beam and the second measurement beam at the second detector;
adapting the delay length of: the reference variable delay path, or the measurement variable delay path, or both the reference variable delay path and measurement variable delay path;
receiving the reference coherence signal from the first detector and the measurement coherence signal from the second detector at the control unit; and
determining the zero-position of the target surface at the control unit based:
on the reference coherence signal and the measurement coherence signal; and
on the reference coherence arrangement and the measurement coherence arrangement, or the delay path difference between the reference coherence arrangement and the measurement coherence arrangement, or the reference coherence arrangement, the measurement coherence arrangement, and the delay path difference between the reference coherence arrangement and the measurement coherence arrangement.

18. The method according to claim 17, further comprising increasing or decreasing a length of the reference beam path relative to a length of the measurement beam path.

19. The method according to claim 17, further comprising using broadband radiation emitted by a broadband radiation source to form at least a part of the first and second measurement beam and the first and second reference beam, and wherein the broadband radiation emitted by the broadband radiation source is adapted to cause the reference spectral coherence pulse and the measurement spectral coherence pulse.

20. The method according to claim 17, further comprising using narrowband radiation emitted by a narrowband radiation source to form at least a part of the first and second measurement beam and the first and second reference beam.

* * * * *